United States Patent [19]

Brandstetter et al.

[11] Patent Number: 5,717,040
[45] Date of Patent: Feb. 10, 1998

[54] CONTINUOUS PROCESS FOR POLYMERIZING ANIONICALLY POLYMERIZABLE VINYL COMPOUNDS

[75] Inventors: Franz Brandstetter, Neustadt; Hermann Gausepohl, Mutterstadt; Reiner Thiele, Kaiserslautern, all of Germany

[73] Assignee: BASF Aktiengesellschaft, Ludwigshafen, Germany

[21] Appl. No.: 859,235

[22] Filed: May 20, 1997

Related U.S. Application Data

[63] Continuation of Ser. No. 592,352, filed as PCT/EP94/02620, Aug. 8, 1994, published as WO95/05401, Feb. 23, 1995, abandoned.

[30] Foreign Application Priority Data

Aug. 16, 1993 [DE] Germany ............... 43 27 495.1

[51] Int. Cl.$^6$ .................. C08F 4/48; C08F 2/06
[52] U.S. Cl. .............. 526/64; 526/88; 526/173; 526/335; 526/346
[58] Field of Search .................. 526/64, 88, 173, 526/346

[56] References Cited

U.S. PATENT DOCUMENTS

| | | |
|---|---|---|
| 2,951,061 | 8/1960 | Gomory .................. 526/64 |
| 3,356,763 | 12/1967 | Dollinger . |
| 4,200,713 | 4/1980 | Wingler . |
| 4,965,327 | 10/1990 | Stachowiak . |

FOREIGN PATENT DOCUMENTS 522 641  1/1993  European Pat. Off. .

*Primary Examiner*—Fred Teskin
*Attorney, Agent, or Firm*—Keil & Weinkauf

[57] ABSTRACT

Anionically (co)polymerizable vinyl or diene compounds are polymerized in solution and in a reaction zone in the form of a flow tube, using an organometallic initiator, by a continuous process in which the reaction takes place essentially without heat exchange with the environment, the residence time is less than 5 minutes and the reaction zone contains no moving parts.

7 Claims, No Drawings

CONTINUOUS PROCESS FOR POLYMERIZING ANIONICALLY POLYMERIZABLE VINYL COMPOUNDS

This application is a continuation of application Ser. No. 08/592,352, filed as PCT/EP94/02620, Aug. 8, 1994, published as WO95/05401, Feb. 23, 1995, now abandoned.

The present invention relates to a process for the polymerization of an anionically polymerizable compound, in particular for the preparation of transparent polystyrene or of polybutadiene.

The relevant prior art includes:

| | |
|---|---|
| EP 0 522 641 | US 3 954 894 |
| EP 0 176 611 | US 4 196 153 |
| EP 0 471 550 | US 4 200 713 |
| EP 3 035 033 | US 4 205 016 |
| EP 3 030 346 | US 4 883 846 |

U.S. Pat. No. 4,883,846 describes a process for the anionic polymerization of styrene. In this process, styrene in ethylbenzene is polymerized adiabatically, ie. without removal of heat, with n-butyllithium in a reactor.

Since it is known that the anionic polymerization takes place to complete conversion, ie. with consumption of the styrene, the disadvantage of this process is that it is possible to use only a comparatively low styrene concentration in order to avoid a high final temperature. An excessively high final temperature leads to thermal termination and hence to an incomplete reaction and an uncontrolled molecular weight distribution. However, low styrene concentrations result in low space-time yields.

According to European Patent 522,641, styrene can be polymerized anionically in an extruder, and the monomer concentration in the feed should be >50%. This gives a relatively high space-time yield. In this process, however, the molecular weight of the polymers and hence the properties of the end products are determined not only by the ratio of initiator to monomer but also by process parameters such as the speed of the screw or the feed rate of the monomers. Thus, very small changes in the process parameters lead to a change in the product properties and finally to a wide specification range for the end products.

European Patent 176,611 and U.S. Pat. No. 3,035,033 describe loop reactors for the preparation of anionic polystyrene. It is recommended that the residence time be at least 1–3 hours and that the circulating volume be at least 15, preferably 25, times the feed volume. The disadvantage of this process is likewise the low space-time yield.

It is an object of the present invention to avoid the disadvantages described and to provide an economical process for the preparation of, for example, transparent polystyrene by anionic polymerization.

We have found that this object is achieved, according to the invention, if the anionic polymerization of styrene is carried out in a reaction zone in the form of a flow tube (so that the total amount of monomers and solvent and at least some of the envisaged amount of initiator are injected at the beginning (inlet) of the flow tube), according to the invention there being no substantial heat exchange with the environment, a residence time of 5 minutes or less being maintained and the reaction zone containing no moving parts.

Instead of styrene, further suitable monomers are other anionically polymerizable, vinylaromatic compounds, such as α-methylstyrene, vinyltoluene, tert-butylstyrene or mixtures thereof.

The solvents usually used for anionic polymerization may be employed. For example, aliphatic, cycloaliphatic or aromatic hydrocarbons which are liquid under reaction conditions and preferably contain from 4 to 12 carbon atoms are suitable. Examples of these are pentane, cyclohexane, methylcyclohexane, toluene, ethylbenzene and xylene.

For example, lithium hydrocarbons, such as methyllithium, ethyllithium, n- or sec-butyllithium, isopropyllithium, cyclohexyllithium or phenyllithium, are used as compounds which initiate the anionic polymerization (ie. initiators). n-Butyllithium and sec-butyllithium are particularly preferred.

The polymerization takes place under the conditions typical for anionic polymerization, ie. in the absence of air and moisture at from 20° to 200° C., preferably from 30° to 180° C. The molecular weight is established via the molar ratio of initiator to monomers.

The novel method of polymerization gives products having a narrow molecular weight distribution, ie. the quotient of weight average to number average molecular weight is from 1 to 1.5.

Products having a broader and also polymodal distribution are obtained by feeding in the initiator at intermediate stages.

The polymerization is generally carried out to a conversion of more than 99.9%.

The essential feature of the reaction is that it takes place both adiabatically and continuously. The reaction zone consists of a flow tube in which plug flow is produced. The flow tube may contain static mixers in order to promote axial mixing. Kenics mixers or SMX mixers from Sulzer are suitable. A mixture of purified solvent dried, for example, over alumina and distilled monomer compound is fed in at the inlet (top) of the plug flow reactor. The initiator solution is metered in separately in order to avoid a premature reaction.

The final temperature of the polymer solution is determined by the concentration of the monomers in the starting solution and is controlled in such a way that the thermal termination of the living chain ends is minimal. In order to reduce this termination, the final part of the tube can be provided with a cooling jacket.

The reaction is generally carried out at more than 5, preferably more than 20, bar in order to avoid premature boiling of the mixture and to achieve a sufficient throughput rate.

The novel process operates with a very high space-time yield and gives products having a narrow molecular weight distribution. The molecular weight distribution of the polymers formed can, if required, be controlled, ie. made broader, by dividing the amount of initiator and adding the individual portions at two or more different points of the flow tube. Thus, it is possible to obtain both products having a broad distribution and those having a bimodal or polymodal distribution.

After the end of the polymerization, the living chain ends are terminated with a protic substance, for example an alcohol, an acid or a mixture of carbon dioxide and water. The polymer solution is then freed from low molecular components by a known method and, if required, provided with lubricants, antioxidants, etc.

Flash devolatilization is preferred, the polymer solution under pressure and at a high temperature being let down into a devolatilizer and the predevolatilized melt then being freed from residual solvent in an extruder.

EXAMPLE 1

The reactor used was a flow tube having a length of 40 m and a diameter of 0.2 m. The first 2 m and the final 20 m were equipped with mixing elements.

A solution of styrene in ethylbenzene was fed in at a rate of 750 l/min at the reactor inlet. The concentration of styrene was 32.5%. A $1.4.10^{-3}$ molar sec-butyllithium solution in ethylbenzene was fed in separately at the same point. The temperature increased from 40° to 171° C. in the course of 100 sec. The conversion was 100%.

The space-time yield was 9,360 kg per $m^3$ per h.

EXAMPLE 2

Example 1 was repeated, with the proviso that the initiators were divided up in a ratio of 1:1 and the first half was fed in at the reactor inlet and the second half in the middle (ie. after a tube length of 20 m).

The space-time yield was 8,430 kg per $m^3$ per h.

EXAMPLE 3

A mixture of 16 parts of butadiene and 84 parts of cyclohexane was dried over alumina, preheated to 40° C. and then fed into the tube reactor at a feed rate of 1,000 l/min. A stream of sec-butyllithium having a concentration of $2.5.10^{-3}$ mol/l was fed in separately at a rate of 0.5 l/min.

Final temperature: 146° C.

Molecular weight: 136,000

Space-time yield: 7,643 kg per $m^3$ per h

EXAMPLE 4

Anhydrous, distilled styrene (8 parts), prepurified butadiene (16 parts), dry cyclohexane (64 parts) and freshly distilled, dry tetrahydrofuran (2 parts) were mixed, preheated to 35° C. and metered into the tube reactor at 500 l/min. sec-Butyllithium having a concentration of $3.2.10^{-3}$ mol/l was fed in separately at a rate of 0.5 l/min.

Final temperature: 144° C.

Molecular weight: 162,000

Space-time yield: 5,732 kg per $m^3$ per h

We claim:

1. A continuous process for the polymerization of anionically (co)polymerizable vinyl or diene compounds, which comprises:

reacting the vinyl or diene compounds in solution in a reaction zone in the presence of an organometallic initiator; said reaction zone having no moving parts and being in the form of a flow tube; wherein the residence time of the reaction in the reaction zone is less than five minutes; and wherein the reaction takes place essentially adiabatically with the environment, and wherein said polymerization is carried out to a conversion of more than 99.9%; and recovering said polymerized vinyl or diene compounds.

2. The process of claim 1, wherein the reaction takes place at a temperature of from 20° to 200° C.

3. The process of claim 1, wherein the reaction takes place at a temperature of from 50° to 180° C.

4. A process as defined in claim 1, wherein the vinyl compound used is styrene.

5. A process as defined in claim 1, wherein the initiator used is n- or sec-butyllithium.

6. A process as defined in claim 1, wherein the solvent used is cyclohexane, methylcyclohexane or ethylbenzene.

7. A process as defined in claim 1, wherein the flow tube contains static mixers at least in parts.

* * * * *